(12) United States Patent
Lyngøy

(10) Patent No.: US 10,206,376 B1
(45) Date of Patent: Feb. 19, 2019

(54) FISH REARING TANK COMPRISING AN EGG-SHAPED SHELL WITH BALLAST

(71) Applicant: HAUGE AQUA AS, Hjelmås (NO)

(72) Inventor: Cato Lyngøy, Hjelmås (NO)

(73) Assignee: HAUGE AQUA AS, Hjelmås (NO)

( * ) Notice: Subject to any disclaimer, the term of this patent is extended or adjusted under 35 U.S.C. 154(b) by 0 days.

(21) Appl. No.: 16/048,817

(22) Filed: Jul. 30, 2018

Related U.S. Application Data

(63) Continuation of application No. 15/578,503, filed as application No. PCT/NO2016/050166 on Aug. 12, 2016, now Pat. No. 10,064,396.

(30) Foreign Application Priority Data

Aug. 12, 2015 (NO) .................................... 20151019

(51) Int. Cl.
*A01K 63/04* (2006.01)
*A01K 61/60* (2017.01)
(Continued)

(52) U.S. Cl.
CPC .............. *A01K 61/60* (2017.01); *A01K 61/65* (2017.01); *A01K 61/80* (2017.01); *A01K 61/90* (2017.01);
(Continued)

(58) Field of Classification Search
CPC .... A01K 63/04; A01K 63/045; A01K 63/003; A01K 63/02; A01K 63/10; A01K 63/042; A01K 61/60; A01K 61/80; A01K 63/006; A01K 61/00; A01K 61/10; A01K 61/59; A01K 61/85; A01K 61/90; A01K 61/95; A01K 63/047; A01K 63/06; A01K 77/00; A01K 79/00; A01K 97/05
(Continued)

(56) References Cited

U.S. PATENT DOCUMENTS 2,011,365 A  8/1935  Kuballe
3,204,605 A  9/1965  Vroman
(Continued)

FOREIGN PATENT DOCUMENTS

FR  2454266 A1  11/1980
GB  2031251 A   4/1980
(Continued)

OTHER PUBLICATIONS

International Preliminary Report on Patentability for PCT/NO2016/050166 (PCT/IPEA/409) completed on Aug. 24, 2017.
(Continued)

*Primary Examiner* — Yvonne R Abbott-Lewis
(74) *Attorney, Agent, or Firm* — Birch, Stewart, Kolasch & Birch, LLP

(57) ABSTRACT

A fish rearing tank has an egg-shaped shell with a vertical long axis and gradually narrowing shape towards a tip portion. The egg-shaped shell holds a water volume for the contained fish in a major wider, lower portion, and encloses air in the minor, upper, tip portion. The shell forms a closed, rigid tank and has one or more water inlets, and one or more water outlets. A ring-shaped buoyancy collar is mounted on the egg-shaped shell. The shell has a fixed ballast in the lower end of said wider, lower portion of the egg-shaped shell.

24 Claims, 10 Drawing Sheets

(51) Int. Cl.
    *A01K 61/80*     (2017.01)
    *A01K 63/10*     (2017.01)
    *A01K 61/95*     (2017.01)
    *A01K 61/65*     (2017.01)
    *A01K 61/90*     (2017.01)

(52) U.S. Cl.
    CPC .............. *A01K 61/95* (2017.01); *A01K 63/10* (2017.01); *Y02A 40/826* (2018.01); *Y02A 40/845* (2018.01)

(58) Field of Classification Search
    USPC ....... 119/227, 203, 223, 260, 216, 219, 248, 119/259, 201, 215, 224, 230, 232, 247, 119/255, 261, 262; 210/416.2, 167.22
    See application file for complete search history.

(56) References Cited

U.S. PATENT DOCUMENTS

| | | | |
|---|---|---|---|
| 3,487,484 A | | 1/1970 | Holmes |
| 4,010,704 A | | 3/1977 | Mayo et al. |
| 4,224,891 A | | 9/1980 | Rinaldi |
| 4,312,296 A | * | 1/1982 | Stelleman .............. A01K 61/60 119/223 |
| 4,798,168 A | | 1/1989 | Vadseth et al. |
| 4,957,623 A | * | 9/1990 | Henzlik ................. A01K 63/04 119/264 |
| 6,117,313 A | * | 9/2000 | Goldman ................ A01K 63/04 119/260 |
| 7,371,162 B2 | | 5/2008 | Matousek et al. |
| 8,171,884 B2 | | 5/2012 | Dornburg et al. |
| 8,925,489 B2 | * | 1/2015 | Hoie ...................... A01K 61/60 119/223 |
| 9,655,347 B2 | * | 5/2017 | Troy ....................... A01K 61/65 |
| 2002/0104487 A1 | | 8/2002 | Brenton |
| 2006/0162667 A1 | | 7/2006 | Papadoyianis et al. |
| 2006/0265940 A1 | * | 11/2006 | McAleer, Jr. ........... A01K 97/05 43/57 |
| 2012/0006277 A1 | | 1/2012 | Troy et al. |

FOREIGN PATENT DOCUMENTS

| | | |
|---|---|---|
| JP | 6-276887 A | 10/1994 |
| JP | 3091345 B2 | 9/2000 |
| NO | 318527 B1 | 4/2005 |
| WO | WO 03/067971 A1 | 8/2003 |
| WO | WO 2010/016769 A1 | 2/2010 |

OTHER PUBLICATIONS

International Search Report for PCT/NO2016/050166 (PCT/ISA/210) dated Oct. 24, 2016.
Written Opinion of the International Searching Authority for PCT/NO2016/050166 (PCT/ISA/237) dated Oct. 24, 2016.

* cited by examiner

Figure 1:
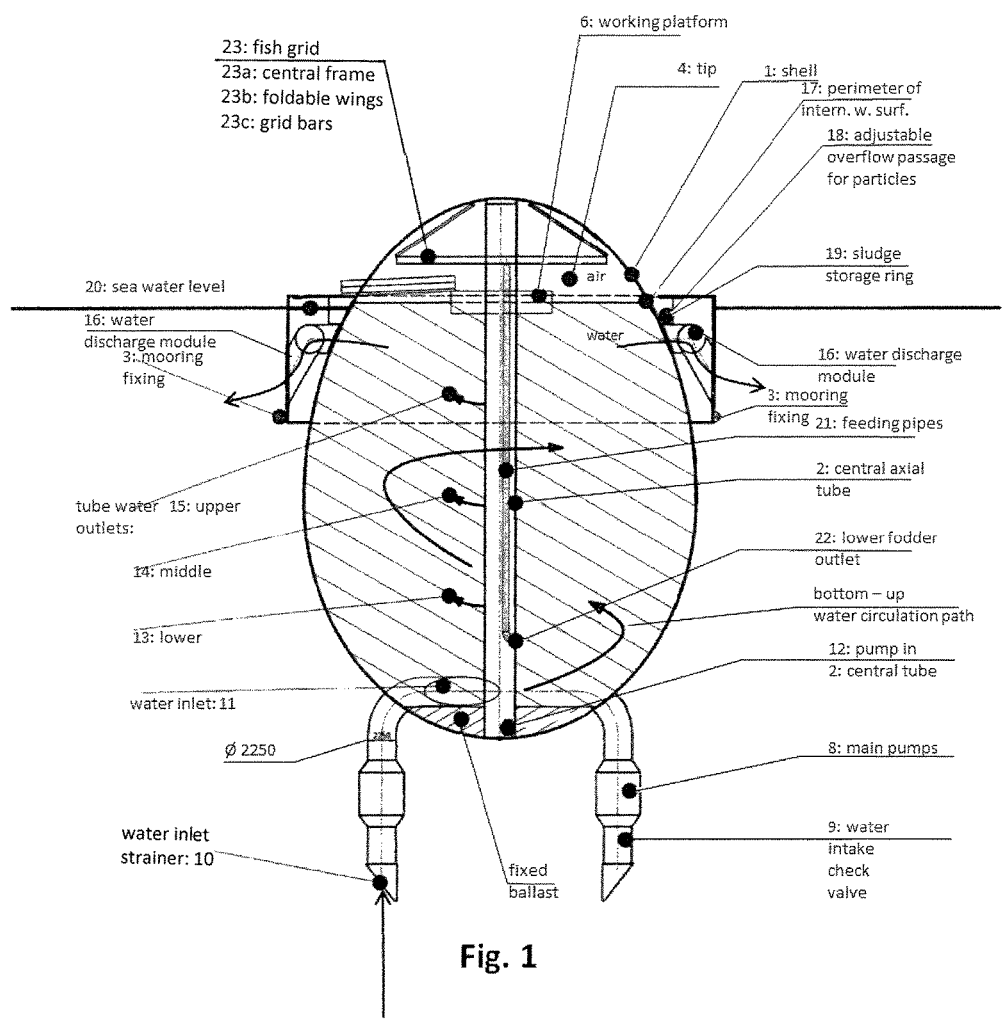

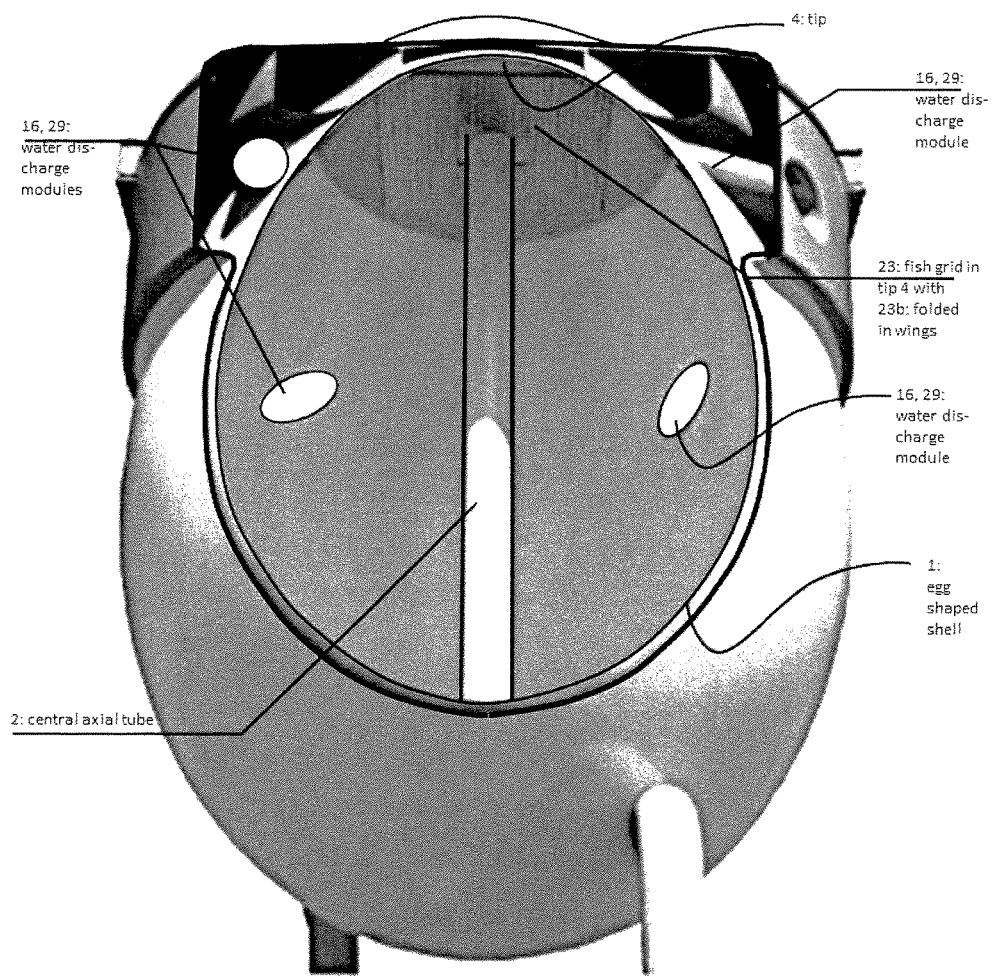
Fig. 5d1

Figure 2:
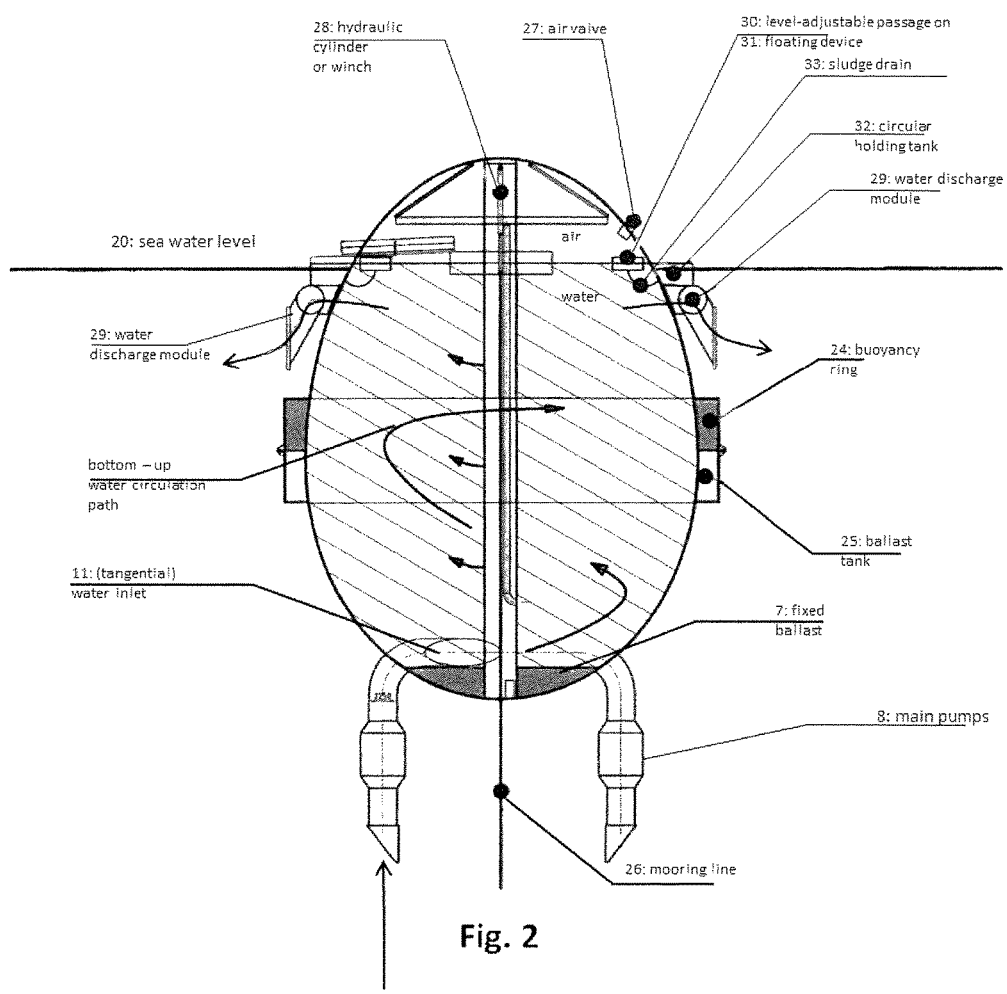

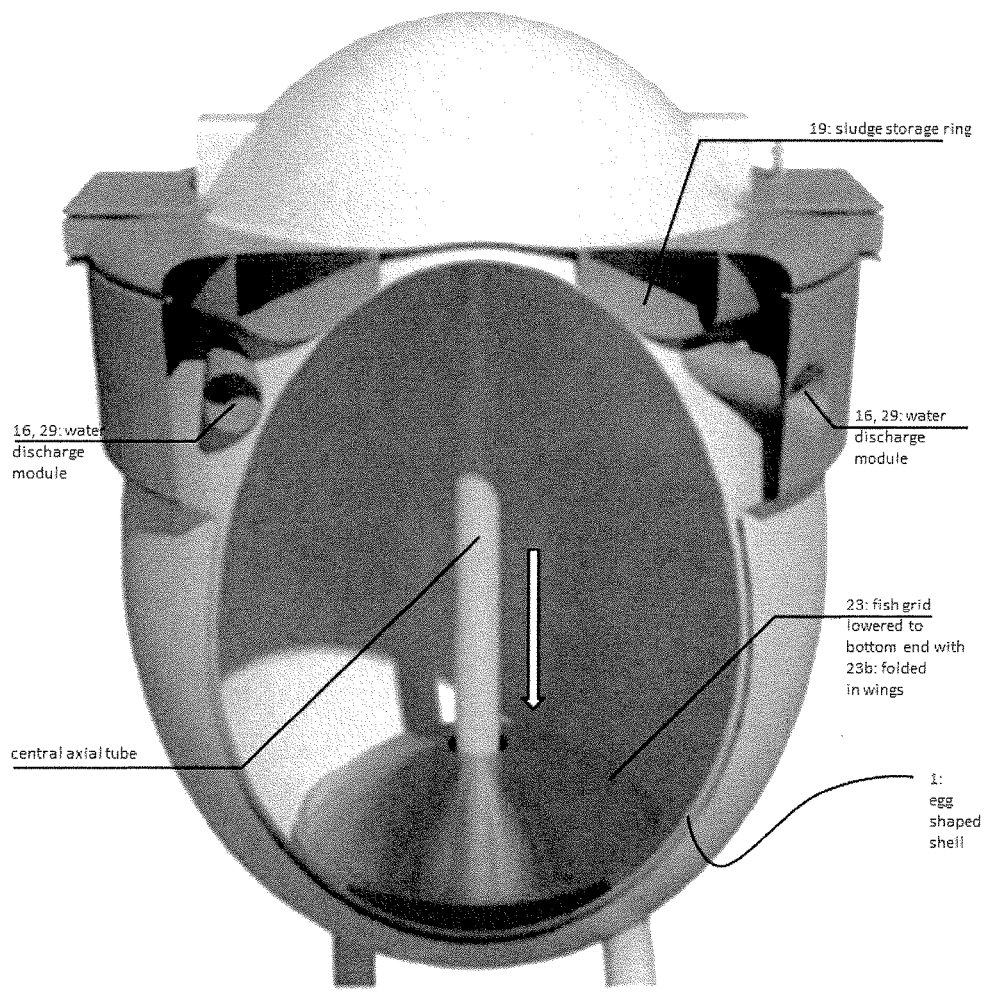
Fig. 5d2

Figure 3:
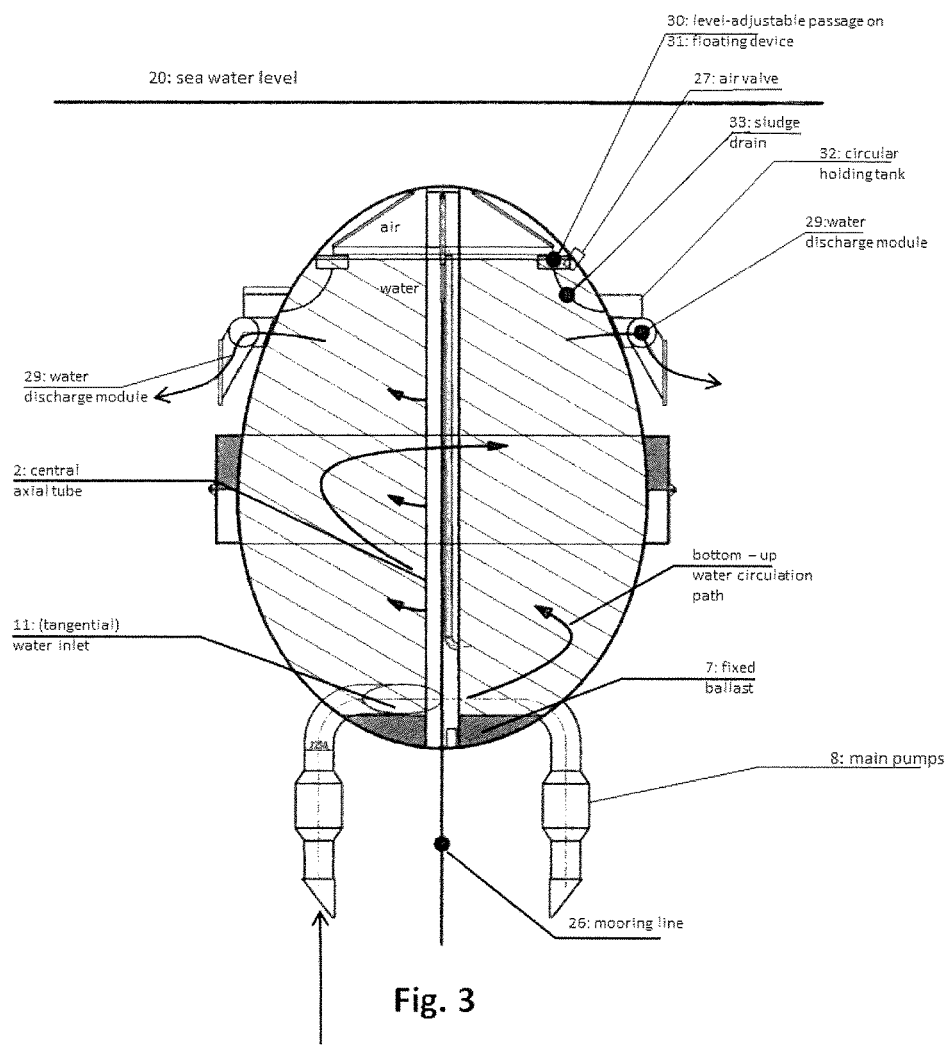

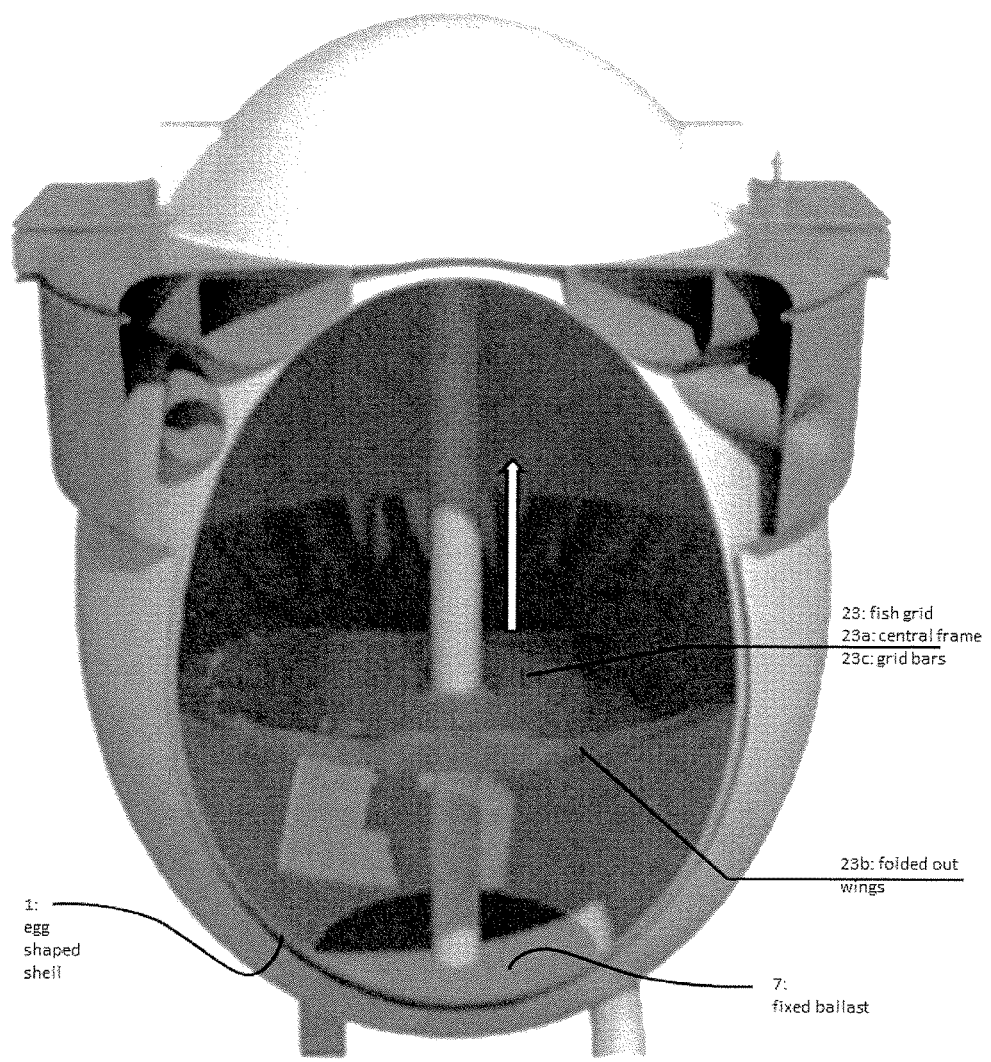
FIG. 5d3

Figure 4:
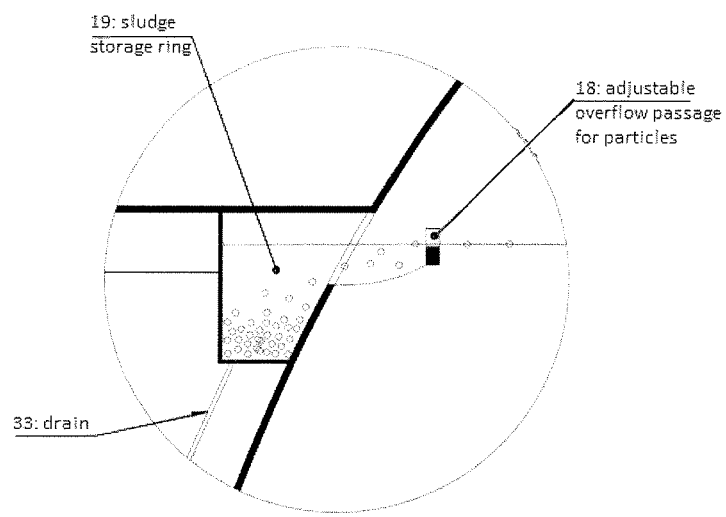

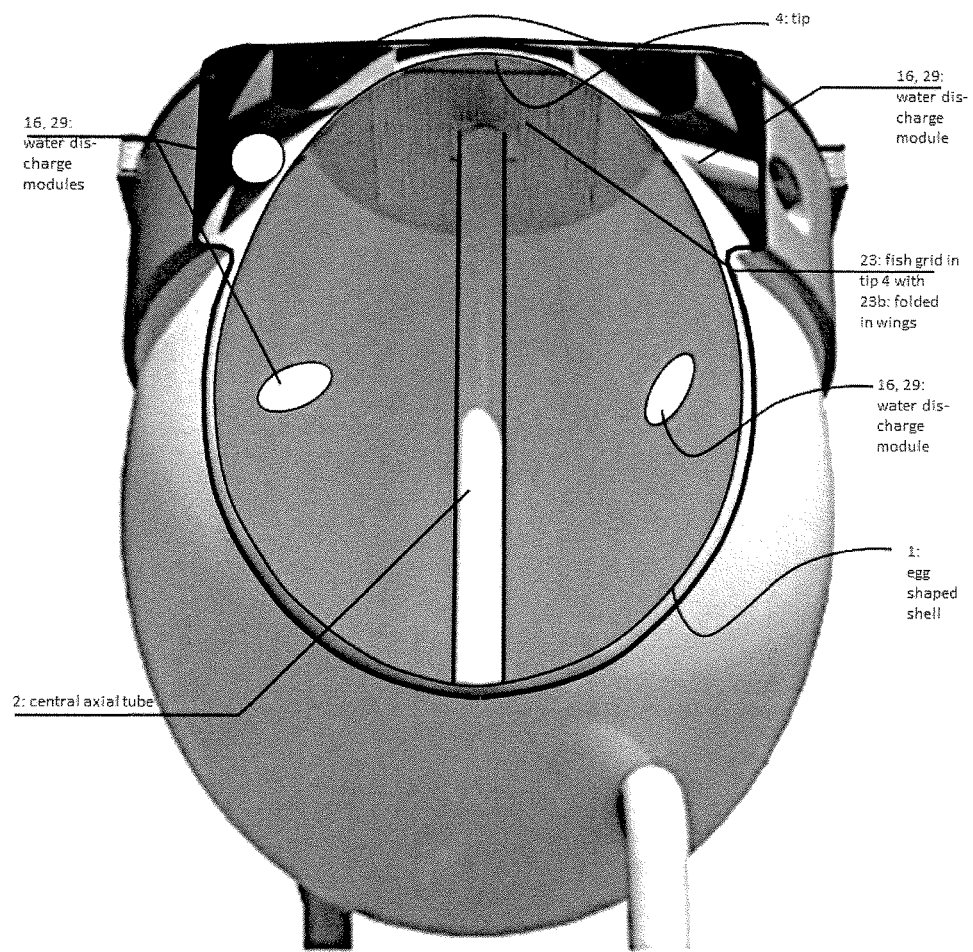
Fig. 5d4

FISH REARING TANK COMPRISING AN EGG-SHAPED SHELL WITH BALLAST

CROSS-REFERENCE TO RELATED APPLICATIONS

This application is a Continuation of U.S. patent application Ser. No. 15/578,503 filed on Nov. 30, 2017, which was filed as the National Phase of PCT International Application No. PCT/NO2016/050166 filed on Aug. 12, 2016, which claims priority to Application No. 20151019 filed in Norway on Aug. 12, 2015, all of which are hereby expressly incorporated by reference into the present application.

1. FIELD OF THE INVENTION

The invention relates to a closed-contained floating, and submersible system for farming and storage of finfish and other aqueous species.

2. BACKGROUND OF INVENTION AND RELATED ART

During the last three decades, captured fisheries production increased from 69 to 93 million tonnes; world aquaculture production increased from 5 to 63 million tonnes. Although 70% of the Earth's surface is covered by water, fish (including shellfish) only represent 6.5% of all protein for human consumption whereas aquaculture represents around 2%. Fish is usually low in saturated fats, carbohydrates and cholesterols and provides not only high value proteins but also a wide range of essential micronutrients, including various vitamins, minerals, and poly-unsaturated omega-3 fatty acids. Thus, even in small quantities, provision of fish can be effective in addressing food and nutritional security among the poor and vulnerable populations around the globe [1].

Current industrial aquaculture farming system is based on open net pen culture. Examples given are typically for the Norwegian salmon industry. The description may just as well apply for salmon farming in other countries, but is to a variable degree relevant to other aquaculture industries. Oxygen is provided through incoming water and fish faeces and carbon dioxide ($CO_2$) and ammonium ($NH_4$) is discharged and carried away by the outflowing water.

The net pen production system leaves the fish population exposed to the open environment.

Water that flows through the net pen may carry harmful microorganisms that potentially can infect the fish population. Several naturally occurring microorganisms[2] (*Vibrio anguillarum*, *Vibrio salmonicidae*, *Aeromonas salmonicidae*, *Montella viscosa*, Infectious *Pancreatic Necrosis* Virus, *Salmonid Alphavirus*, Infectious *Salmon Anaemia* Virus, *Piscirickettsia salmonis*, Infectious *Hematopoietic Necrosis* Virus, and many more) can cause disease in farmed salmonids [2]. The fish health status is subject to comprehensive surveillance both internationally (www.oie.int), from National animal health institutes [3] and also by the farming companies. To combat the most prevalent bacterial and viral diseases, pharmaceutical industry have researched and developed vaccines that are common in use. The value of vaccination is undisputed in industry. Harmful microorganisms cannot be eliminated by vaccination, but vaccination immunises the fish and enables it to reject the infection and not develop clinical disease. Far from all harmful organisms can be prevented by vaccination.

Parasites prevalent to wild salmonids such as the sea louse (*Lepeophtheirus* and *Caligus*), infect farmed salmonids. The most prevalent and widespread is the Salmon louse (*Lepeophtheirus salmonis*). Once clinical disease is established in one farm, the harmful microorganisms represent an increased risk of contracting disease also to neighbouring farms [4].

As the number of fish farms are increasing, the high volume of farmed fish may become disproportional to the corresponding number of natural hosts in a given area. At a certain production level, which may vary from place to place, multiple open net pen farming system run the risk of creating an ecological imbalance in which case a fish farm may become artificial incubators for harmful microorganisms and parasites [5]. Once a fish population is harbouring harmful microorganisms or parasites, it begins shedding to the surrounding environment and neighbour farms. The shedding may expose and affect the net pens adjacent to the diseased fish population, neighbouring sites and potentially also wild salmonids residing in habitats nearby the site. Understanding the exact interaction is challenging and has over many years been subject to substantial scientific research [6].

The Salmon louse is common to farmed salmon. Its reproduction cycle includes both free-living stages and fixed stages in which it resides on the salmon skin. The reproductive capacity increases proportionally to increasing temperature [7] and densities of farms [8].

The Salmon louse is phototactic (migrating towards daylight) and its infective stage behaviour adapts to find a salmonid host predominantly residing in the top layer of the marine environment. It has been suggested that the infective stage of the Salmon louse remains in the first four meters of the surface [9, 10, 11]. Both research and practical farming confirm that infestation levels are significantly less when farmed salmon are sheltered from the top 10 meters exposure of infective salmon louse larvae [9, 10, 11, 12, 13, 14]. However, the use of skirts around salmon cages to reduce infestation of salmon lice, result in reduced oxygen levels and thereby it can stress the fish, impair welfare and feed utilisation [15].

When the salmon louse larvae infects a new host, it lives out of eating mucus, skin tissue and blood off the salmon. The salmon louse may pick up microorganisms and carry for a period of time [16, 18]. Wildlife has many examples of parasites that serve as biological vectors. It is shown that the salmon louse can be a biological vector for microsporidium [17]. Hence, the salmon louse may serve as a mechanical and biological vector that can carry harmful micro-organisms from fish to fish, from one cage to another as well as from fish farm to fish farm.

Salmon louse from salmon farms may affect and harm wild salmonids once shed in high numbers from salmon farms. Especially when the young salmonids are migrating from rivers to the ocean and pass nearby dense farming areas, the risk of negative impact is increasing. Likewise, sea trout populations do have their summer habitat in fjord and coastal areas where they may be exposed to Salmon lice during spring, summer and fall [19, 20, 21].

The spread of sealice, both magnitude, dynamics and pattern is crucial to understand how the challenge can be mitigated, and it is subject to intense research [22].

To protect the welfare of the farmed salmon and the wild salmonids, Government has enacted legislation to keep the level of sealice low in salmon farms, especially during the spring migration period. Since 1988 salmon lice has been treated by use of chemical drugs like organophosphates, pyretroids, emamectin, teflu,diflubenzuron, hydrogenperoksid as well as combination of these. Since the very start of combating the Salmon louse with chemicals, it has shown a remarkable ability to develop resistance against any drug available. Since 2007, the salmon farmers along the Norwegian Coast have experienced that treatments against the salmon louse have become less effective. Over the last 7 years situation has impaired are currently seeing multi-resistance i.e. no drugs are effective any more. In parallel, use of non-medical tools against the Salmon louse has accelerated. For instance use of cleaner fish have increased substantially [23]. Cleaner fish is fish that eats the Salmon louse off the skin of farmed salmon. This habit is observed also in nature and an elegant way of delousing farmed salmon in a pen. Wrasse was introduced as cleaner fish the nineties. The fish were caught by locally and delivered to fish farms. Industry started to research farming of wrasse in 2009. In 2011, use of lumpfish was introduced as cleaner fish and has become popular due to its higher activity at lower temperatures. Lastly, a wide range of physical and mechanical methods have been tested to alleviate the dependency of drug use. Some of these demonstrate promising results. The advantage of using non-medical tools against the Salmon louse is that these do not generate resistance.

Still, in 2015, the salmon lice represent the biggest fish welfare and environmental challenge for the industry and has far reaching economical consequences [19, 24]. The combating of the salmon lice continue to be predominantly handled by chemical methods and the use of drugs are increasing. Supplemental to this, one is aiming to scale up use of cleaner fish as well as other non-pharma tools.

Since 2009 the cost of combating sealice has risen from NOK 0.50/kg to NOK 5.00/kg and above. The problem of salmon lice is now so serious that the Norwegian Government has decided to restrict industry growth in areas where the salmon lice problem remains unresolved. Future growth will be based on strict performance regarding sealice levels [25, 26].

In traditional net-pen farming of Atlantic salmon, after all fish are harvested, the site has to be fallowed for 2 months before new fish are allowed to be put in. The fallowing period occurs every second year corresponding to the production period of 14-22 months in the sea. The fallowing regime is a sound practice adopted from agriculture and enables the site to cleanse and the seabed surrounding the farm to restore its original state after the farming production period with high organic load due to feed spill and faeces from the fish [27].

In some areas subject to severe sealice burden, a mandatory zone fallowing of 1 month for all sites applies every second year as part of the two months fallowing of individual sites [28]. In fact, due to under-performing sealice management, some sites have been enforced by regulation to reduce the production [29].

While having fixed assets like for instance a barge and numerous large cages sitting empty in a non-productive site, the fallowing periods truly represent an extra cost.

Open net pen farming has during the last decades relocated to more exposed sites with better water current conditions, which allows oxygen rich water to pass through. Consequently, the farmer can hold more fish per site. A well-located site can offer higher volumes of water passing through per unit of time compared to previous sites. But the increased total flux of water may also cause problems. Assuming a random distribution of potential harmful micro-organisms in the sea, the total exposure will correspond to the volume of water flowing through a fish site population.

So does also the shedding [8]. Even in sites with improved natural conditions, one may suffer disease and parasitic infections. Although natural farming conditions have been much improved by the relocation of sites, the mortality during one production cycle has not improved correspondingly, and is averaging between 10-20% per cycle across the Norwegian salmon farming industry. A recent study carried out by Norwegian Food Safety Authorities following 307 million fish from entry to harvest, concluded average mortality was 16.3% for Atlantic salmon and 18.3% for Rainbow trout [30]. Mortality in fish farms may have numerous causes, for instance infectious diseases, production diseases, loss when handling and fish stress. The study above concluded that issues related to osmoregulation at transfer and infectious diseases constituted the major causes of mortality.

The open net pen systems show rapid variations in temperature, salinity, current, presence of algae, and occurrence of predators (wildlife that see farmed fish as prey). As many fish are unable to adjust to the various stress factors, welfare of the farmed fish is under pressure and elevated mortality is the result. Fish subject to stress, become more susceptible to infectious diseases.

Farmed fish are fed extruded and pelleted feed. These are condensed and high-energy particles ranging from 3-12 mm in diameter. The feed is offered to the fish in the cage largely by automatic feeders and minor volumes by hand feeding. Cameras are located in many of the pens to monitor and prevent over-feeding.

Adequate feeding in various weather conditions is challenging. It is recognised that between 5-10% of the feed is never eaten by the fish and is discharged into the seabed surrounding the site [31]. The economic feed conversion rate in salmon farms ranges from 1.0-1.4 with an average of 1.15 in statistical review. The undigested part of the feed represent 25% of the weight. Assuming one could capture both feed spill and faeces, this would account for at least 30% of the nutrients of the feed [32]. Cost of feed is the single highest cost and represents between 50-60% of the cost per kilo of farmed salmon. In other farmed species it is similar. There is a significant potential for cost saving and for saving of resources and environment by eliminating the waste.

Fish also produce faeces that is discharged in the environment. It currently represents organic waste. The faeces is rich in phosphorus, which is a scarce resource and in global demand. The fish waste can also be utilized for biogas production and blended with other types of organic offal to become valuable fertilizer. The amount of dry matter from faeces in hatcheries varies a lot depending on the physical quality of the feed, raw materials and size of fish [33]. While discharge is subject to filtering in land-based farming like hatcheries, all of the faeces in sea farms are currently discharged into the water and carried away by the current. Depending on the tide and/or the current, there is little or much spread of the faeces. Scientific studies suggest that discharging of faeces is presently not a limiting factor for the industry as long as it sub-cedes the carrying capacity of the recipient. However, it is a waste of resources which could be better utilized.

Fish escape in the salmon farming industry is recognised as a significant problem. Much resources are spent to prevent escape from the farms and yet the endeavours are only rewarded with partial success. Due to the significant number of farms in operation along the Norwegian Coast (~600) representing maybe as much as 600 million fish, one should expect more fish to escape. The fish farms are vulnerable to the elements. Escape prevention is high on the legislative and industry agenda. It has led to new technical regulations (NYTEK), and it is subject to close monitoring and investigation of incidents by Directorate of Fisheries [34]. Semi-contained (open in the top) farming units have also suffered structural damage during storms.

Escaped fish may enter the rivers and interbreed with wild salmon stocks, destroy egg nests in the riverbed or potentially transfer disease. The magnitude of the damage to the wild stocks of Atlantic salmon caused by escaped farmed salmon and rainbow trout, is still debated. However, it is undesirable to lose fish from a farm. Equally, it is undesirable that escapees end up in the vulnerable ecosystems in salmon rivers [21, 35, 36]. The unresolved escape issue represents a restriction on the Norwegian industry for further growth. Large sea-areas in the fjords that are ideal for farming, are closed due to the risk of escape.

In conclusion, we can say that current net pen fish farming has a significant and untapped potential for increased feed utilization, reduced environmental impact as well as improved fish welfare and waste recycling management.

DESCRIPTION OF RELATED ART

The inventor is familiar with the prior art inventions listed below none of which represent a similar invention as the one in this application. Parts of the system are described from other sectors and covered by prior art.

US 20060265940 A1 "Egg-shaped live bait well system" describes not a fish tank, but a live bait well for storing and maintaining live bait. It includes a container having an egg shape with the tip pointing downwardly. The bait container includes a top lid connected by a hinge to a main body and a water tight seal provided by a gasket. The container includes moulded cooling device holders and a drain. A water purification system is provided that includes a pump and an oxygen aerator infusion device and a charcoal filter in line in a tube system connected to an outlet port and an inlet port of the main body of the container.

U.S. Pat. No. 4,798,168 A "Arrangement for farming of fish, shellfish and other marine beings" describes an vertical cylindrical arrangement with a funnel-shaped bottom. It comprises a bag having circular cross-section submerged in water with an upper edge of the bag defining an opening at the water surface and fastened to floats or disposed in a land base arrangement. The cloth of the bag is watertight. A hose and pump arrangement is provided to suction water from a depth having a favourable water temperature, and expel the water within the bag via an outlet at the water surface, the outlet being oriented tangential to the horizontal cross-section of the bag.

U.S. Pat. No. 8,925,489 "Fish farming pen" to Jørn Høie, describes a fish tank for use in water and comprises a main part (1) made of a watertight, substantially rigid material and has an outlet for effluent (12). The main part (1) is hemispherical. It may slip unhindered through the water along a spherical path without affecting the body of water inside the cage. The forces acting on the main part (1) from the surrounding water act mainly along the shell, not perpendicular to the shell.

US 20060162667 "Aquatic habitat and ecological tank" describes a self-contained, floating fish aquaculture tank for containing fish and other aquatic animal, plant, and algal species. It includes a series of panels joined together by flexible connecting joints to form a cylinder-shaped tank enclosure with a conical bottom surrounded at or near the open end by a water-resistant and buoyant foam. The tank is placed into a body of water where it floats and maintains the same water temperature as the surrounding body of water. The tank includes a waste cone at the bottom of the tank enclosure to which the lower portion of each panel is attached.

U.S. Pat. No. 8,171,884 "Method and system for feeding aquatic animals" comprises a method and a system for feeding aquatic animals. The method includes submerging, at least partially, a chamber in a water reservoir, the chamber comprising a bladder comprising food for aquatic animals, periodically pumping water from the water reservoir into the chamber, exerting, by the pumping, a force on the bladder, and thereby dispensing the food into the water reservoir.

U.S. Pat. No. 4,224,891 "Semi-submersible vessel having a sealed closed chamber of truncated ovoid shape" describes modules each comprising a sealed chamber of annular cross-section, a partially immersed support structure secured to the chamber, and a platform or deck carried by the support structure. The support structure comprises a trusswork of tubular members. The sealed chamber comprises a plurality of toroidal storage reservoirs and ballast tanks and has a truncated egg shape below the water surface and open in the wider, upper truncated end.

U.S. Pat. No. 3,204,605 "Live fish grading apparatus" describes a longitudinal passage with a longitudinal bars forming a grating for sorting small fish dropping through the grating, and bigger fish for passing along on top of the grating.

U.S. Pat. No. 2,011,365 "Adjustable sieve describes such adjustable sieve" is an adjustment mechanism for a sieve.

U.S. Pat. No. 7,371,162 "Sieve adjustment mechanism for an agricultural combine" is an adjustment mechanism for a sieve. opening size of sieve segments of the cleaning system of an agricultural combine disposed in end to end relation, which allows jointly adjusting the sieve sizes, or separate adjustment.

JP06276887 "Culture crawl" describes a submersible or semisubmersible spherical shell with a soft hull kept in spherical shape and buoyancy controlled by air pressure. The fish container has a lower outlet for faeces in the bottom and a fresh water inlet in a top portion.

NO318527 describes an open top vertical cylindrical tank with a near-hemispherical tank bottom with a transition to a funnel-shaped lower end. A sludge separating outlet is arranged on a stand pipe in the bottom of the funnel.

U.S. Pat. No. 4,010,704 shows an antenna buoy with a three quarter spherical rigid shell arranged for not rolling in sea waves. An object of the US patent is to provide a sphere tuned against roll and heave providing a stable platform for the drill rig.

U.S. Pat. No. 3,487,484 shows an anchored drilling platform comprising a hemispherical shell hull with a closed deck and a derrick holding a drill pipe string to the sea floor.

Passive grading by use of a net providing columns in-between which the small fish may pass, is well known in the industry.

3. FIGURE CAPTIONS

FIG. 1 shows a vertical cross-section and partial view of a first, surface version, a first embodiment of the fish tank of the invention comprising a vertically oriented, tip-up fish tank filled with water to a desired level and with an air-filled tip portion, and having a water intake near the bottom end and a water outlet near the internal water level. In an embodiment the surface embodiment has a ring-shaped floating collar. In an embodiment there is arranged a sludge storage ring with the floating collar, and a sludge separation system is arranged near the internal water surface perimeter.

FIG. 2 illustrates a vertical cross-section and partial view of a second, submersible version, a second embodiment of the fish tank of the invention comprising a vertically oriented, tip-up fish tank filled with water to a desired level and with an air-filled tip portion, and having a water intake near the bottom end and a water outlet near the internal water level. In this submersible version the water circulation discharge module is still near under the internal water surface and the water inlet to the tank is near the bottom of the tank, and preferably near tangential.

FIG. 3 illustrates the above submersible embodiment, now in a submerged state. Air has been let out through the laterally and near top arranged air valve and the internal water level has been allowed to rise to this level, from where it in this embodiment can not rise further. In an embodiment of the invention a mooring line is tightened in order to contribute to the submerged stability. In an embodiment the buoyancy ring and the ballast tank is arranged about the broadest portion of the egg-shaped tank. Still in this submerged state the water may advantageously be let in through the preferably tangential inlet near the bottom of the tank, and let out near under the internal surface even though this internal surface has been raised. In an embodiment the sludge is taken out via a level-adjustable passage on an internally floating device and led via a sludge drain to the external circular holding tank. Thus the entire egg-shaped fish tank may be operated for fish farming while being submerged, without any significant interruption.

FIG. 4 is an illustration of an embodiment of the invention wherein the particles have concentrated at the water surface towards the perimeter of the tank. By the higher level of the water inside the tank compared to the outside of the tank i.e. the level of the sea, the surplus water in the circular holding tank is drained. The particles in the fish tank float over a level-adjustable passage built like a floating device, and into the circular holding tank from which collection is possible by means of sludge sucking device.

Figure 5A:
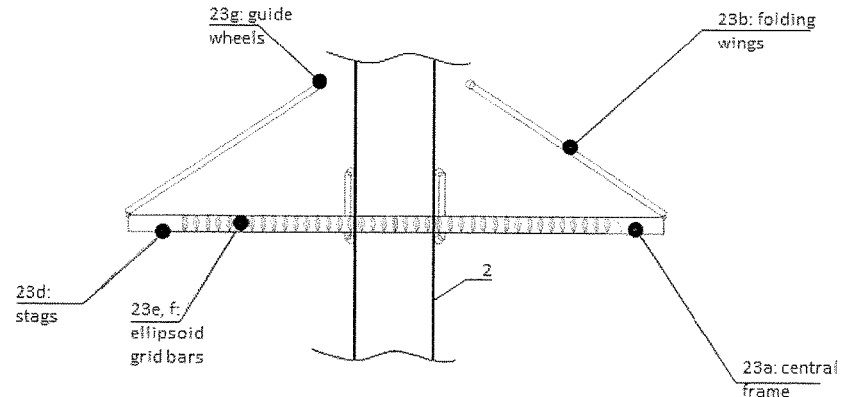

FIGS. 5a-5c and 5d1-5d4 show details of the vertically movable grid and its operation. In FIG. 5a the fish grid is shown in a folded-in state. In this state it may be stored in the top of the tank while not operating down in the water volume.

Figure 5B:
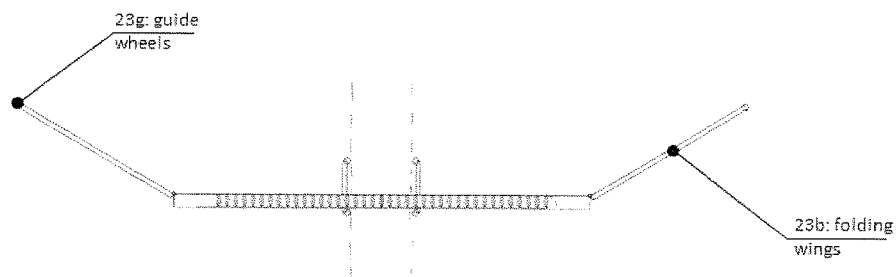

In FIG. 5b the fish grid is shown in a partly unfolded or expanded state for use down in the water volume of the tank.

Figure 5C:
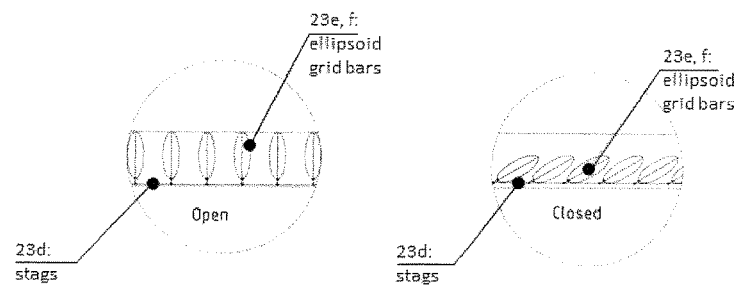

In FIG. 5c is illustrated a suspension for crossing ellipsoid bars. The bars are turnable by stags (23d) mounted perpendicularly to the direction of the bars.

FIGS. 5d1-5d4 show four different positions:
5d1: Folded and stored in top position
5d2: Folded and lowered in the bottom
5d3: Expanded in the middle
5d4: Catching and crowding fish.

Figure 6:
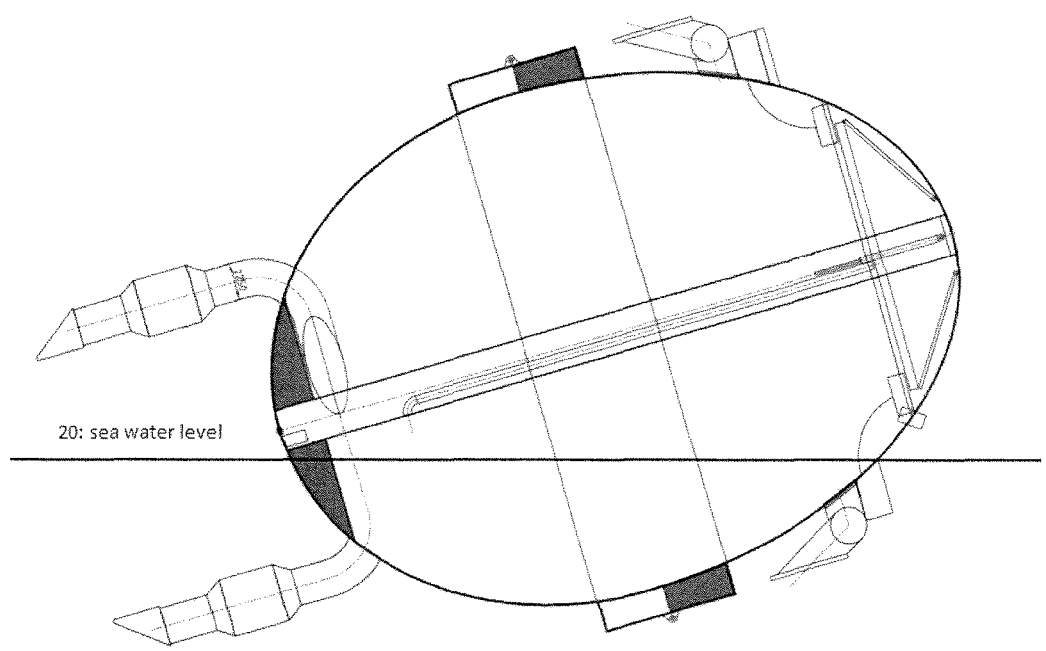

FIG. 6 illustrates after the water in the tank being evacuated by reversing the pumps while sealing off the water discharge area. The tank will gradually be elevated in the water, and tilted to the side while still floating on the sea.

4. DESCRIPTION OF EMBODIMENTS OF THE INVENTION

4.1 Summary of the Invention

The applicant has invented a closed-contained floating and submersible farming system for farming and storage of finfish and other aqueous species, where a container (hereinafter the "tank" or the "fishtank") its geometrical shape, water flow system, anchoring system, fish faeces collection, the adjustable fish grid collector and separator (hereinafter "the fish grid"), and related operating functions, represent inventive solutions that in sum significantly reduce environmental impact, improved waste management and production performance, as well as enhancing fish welfare. Furthermore, the invention expands the area where fish and other marine species can be farmed, including inshore and offshore, fresh water lakes, rivers and waters covered by ice parts of the year. The invention is depending on reliable supply from on-shore electrical power supply.

The invention is a fish tank comprising the features of:
an egg-shaped shell (1) with a generally vertical long axis and gradually narrowing shape towards its tip volume portion (4);
said shell (1) forming a generally rigid tank;
said shell (1) being closed,
said shell (1) having one or more water inlets (11),
said shell (2) having one or more water outlets (16, 29),
said egg-shaped tank (1) for holding a water volume in its major lower volume portion and enclosing air in its minor, upper tip volume portion (4).

The invention is also a method for providing and using such a tank as defined independently in the set of claims.

Dependent claims to these claims are listed in the attached set of claims.

4.2 Description of the Drawings

The drawings show two different variations of the invention: FIG. 1 shows the tank as a contained fish rearing system which is held permanently in surface position. Hereinafter this variation is referred to as version 1. FIGS. 2 and 3 show the tank in a surface and submerged position respectively. Hereinafter this variation is referred to as version 2.

4.3 Detailed Description of Embodiments of the Invention Pertaining to Both Version 1 and Version 2

The invention comprises an egg-shaped container (1), hereinafter the "tank", "unit" or the "fish-tank" (1), that provides a complete and seamless double-curved surface that is significantly stronger than current systems. With its solid and firm construction and innovative characteristic described below under advantages and properties no. I, III, and VIII, the tank provides a significantly reduced risk of fish escaping. While in net pen farming, only the net is keeping the fish from escaping, this tank is fully contained with a solid barrier throughout the sea phase of the production. The material used for construction may vary depending on the location and can be composite, rubber, fibre armed canvas, combination of these or other materials. The invention utilizes assembly and mounting techniques known from the ship building industry.

The shape of the tank (1) with its centre tube (2), diverts forces caused by wave actions, wind, current and tension from mooring arrangements (3) and the tank's geometrical structure sustains and reliefs its integrity while under deflection caused by external forces.

The egg shape of the tank increases the volume in which fish can be held and consequently the production accordingly compared to hemispheric structures. 90% of the interior volume consists of water whereas 10% is air located in the top, hereafter also called the tip portion (4) of the egg-shaped shell (1), please see FIGS. 1, 2, and 3. The air cap in the tip (4) holds atmospheric pressure and communicates with the outside air by a ventilation fan that also regulates adequate air intake.

The egg shape of the tank with its gradually narrowing shape towards the top provides a unique and surprising wave attenuation. The waves are broken and delayed by the exterior collar. When internal waves are hitting the double-curved wall on the other side, the wave is attenuated. The vertical and horizontal curving produce a wave reflex that calms the wave rather than returning it full force.

In hemispheric or cylindrical fish tanks, the wave hitting the tank from outside goes straight and unbroken through on the inner side and bounces back from the wall.

If the wavelength on the outside hits the wavelength of the inside, resonance can occur. The amplitude of the inner wave can then double and cause unpredictable waves, damage and potentially harm fish and people.

The centre tube provides a guide for equipment that is mounted inside the tank (ex. the fish grid, working platform (6), sensor equipment for water quality, and fish welfare monitoring, and channel for supplemental ad optimised water flow into the centre part of the tank. The centre tube water supply secures satisfactory replacement of water in the centre part the tank and enables the operator to maintain good circulation throughout the entire water volume. Also, the tube defines a minimum track for the water near the centre of the tank. Thereby it prevents the water from entering the centre which would have created a downwards vortex causing counter-current and stagnant water.

In case of emergency, ex. toxic algae in intake level, the ability to close, filtrate or treat the water intake can be built into the tank. Sensors that can provide the operator with early warning of an upcoming algae or environmental threat are mounted beside the water intakes (9).

The water intakes can be extended to variable depths. If required, they can be equipped with means to disinfect, filtrate or any other water treatment method that reduces the risk of harmful microorganisms entering the tank.

In the bottom of the tank and integral to the construction, fixed ballast is built in (7) for the stability of the tank.

The tank can be manufactured in any size. Typically, for Atlantic salmon, the size would be 4500 m3 for fish up to 1 kilo. For fish up to 5.5 kg typical size would be 22000 m3. The latter tank could hold 50 kg/m3 and totally 1000 tonnes per tank. If water exchange is working ideally, the tank will be built as larger units as well.

The tank has its power supply from a central barge or land-base.

Two main pumps (8) with check-valves (9) and inlet strainer (10) are mounted below the bottom of the tank. The water-intake is at least 20 meters below surface. The diameter of the intake pipe is in one embodiment 2250 mm. The two water inlets (11) in the tank are positioned horizontally and tangentially just above the fixed ballast. The pumps provide a circular flow of water to the top.

In addition, a pump is mounted in the centre tube (12) and pumps water up the tube. The centre tube is sealed off near water level to rise the water pressure inside the tube. Water can be let out through remote operated hatches at $\frac{1}{4}^{th}$ up the tube (13), $\frac{2}{4}^{th}$ (14) up the tube, and $\frac{3}{4}^{th}$ (15) up the tube. The three levels are each optional and can be run one at the time or in combination. This function secures the operator to control the waterflow in the tank.

The tank's geometrical shape resemble that of a bird's egg and provides an innovative possibility to concentrate and collect fish faeces and feed spill. The particular composition and design of the structure with its gradually narrowing shape will increase the speed of the water flow and enhance vertical and centripetal forces on particles as the water rises to the top of the tank.

The particles will concentrate at the water surface towards the perimeter of the tank (17). By the higher level of the water inside the tank compared to the outside of the tank i.e. the level of the sea, the surplus water in the circular holding tank (19) is drained. The particles in the fish tank float over a level-adjustable passage (18) built like a floating device, and into the circular holding tank from which collection is possible by means of sludge sucking device. (FIG. 4).

In most locations, it is neither necessary to semi-submerse the tank, nor to fully submerse it. For such use, version 1 is suitable (FIG. 1). Version 1 has its buoyancy at the water level (20). The surface buoyancy provides sufficient stability and control so that central vertical mooring is redundant.

Fish are given extruded and pelleted feed ranging from 3-12 mm in diameter. The feed access the tank through air driven pipes from a central barge or land-base. It is loaded into two feeding pipes (21) mounted inside the centre tube. These reach 3 meters above water level and end approximately 5 and 10 meters above the bottom of the tank at which point they exit the tube into the tank (22). At the top of the feeding pipes, an air driven piston is mounted. After the filling with desired volume of feed into the pipe, the piston moves downwards, the feed is pushed out of the lower opening of the pipe providing fish with batches of feed.

The fish grid (capturing and grading devise) (23) is stored in the top of the tank. The grid is shaped like a flexible, foldable and expandable device. See FIGS. 5a (folded) and 5b (expanded).

The grid is integral to the tank and consists of two main parts:

a. The central frame (23a) equipped with hinges for foldable wings (23b) on the outside, and, on the inside, suspension for crossing ellipsoid bars (FIG. 5c). The bars are turnable by stags (23d) mounted perpendicularly to the direction of the bars. When turning the central bar mechanically, all of the bars will turn accordingly. While turned, the space between the bars are gradually opened and enables the operator to decide which size of fish that shall be permitted to pass between the bars and which are kept above the grid. While turned fully to the one side, the ellipsoid bars form a water permeable but dense surface that will catch all fish. Bars in open (23e) and closed (23f) position is shown in FIG. 5c. Depending on the species of fish farmed, the hinging, shape and spacing of the ellipsoid bars may vary.

b. The foldable and expandable wings that are hinged on the central frame. When in its stored position, the grid is located at the top of the tank. In this position, the wings are folded inwards (FIG. 5a). The grid can be lowered slowly into the tank by use of a winch. The wings will stay folded until released manually. Once lowered into the water the folded wings allow the fish to pass outside so that desired volume of fish are above the grid at the point when the wings are unfolded (FIG. 5b).

From here, or at any depth in the tank, the wings can be unfolded by the force from the winch. The outer edge of the wings these are equipped with small guiding wheels (23g) in order to adjust to the variable radius of the tank. The wings form a water permeable but dense surface that collect all fish.

In FIGS. 5d1-5d4 the grid is shown in four different positions:

5*d*1: Folded and stored in top position
5*d*2: Folded and lowered in the bottom
5*d*3: Expanded in the middle
5*d*4: Catching and crowding fish
Functionality of the Grid:
At the desired depth, wings are unfolded and divides the tank into two compartments, —one above the grid and one below. Slowly but steady the grid is elevated. The grid will serve the function of
  i. collecting parts of the fish population
  ii. collecting all fish in the tank
  iii. grading off the fish ready for harvest
  iv. counting of fish from one compartment to the other The grading and collection grid is integral to the tank. Passive grading by use of a net providing columns in-between which the small fish may pass, is well known in the industry. However, although it is developed exclusively to the unit, it is also adaptable to other circular-shaped or hemispheric tanks. It's mechanical construction and functionality are unique. Once elevated slowly through the fish population it can serve as
  a) A grader for harvest size fish by leaving smaller fish to pass between the bars that are crossing the central frame. Typically, an opening between the bars of 15 cm will grade off all fish above 4 kg.
  b) A grader for medium sized fish at large and medium size at around average weight of 135-2 kg. Typically, a opening of 8 cm will grade off fish that are above 1.5 kg.
  c) A fish collecting system to empty the tank by turning the bars to a closed position.
  d) A fish collection system to count the fish in the tank by turning the bars to closed position.

The tank is not transparent to daylight. It must have artificial lighting inside. Absence of daylight enables the operator to control daylight hours including shortening the day and year cycle.

The tank can be cleaned outside and inside by use of automatic washing machines. Washing of the tank can be done while in operation by use of an automatic surface cleaning device. It can also be carried out after all fish are harvested. The water in the tank is evacuated by reversing the pumps while sealing off the water discharge area. Then, the tank will gradually be elevated in the water, and tilted to the side (FIG. 6).

Once almost emptied of water, all vital functions can be serviced on site, it can be towed to nearest dock, or hauled on board a service vessel for timely maintenance and repairs. The remaining water can be pumped out by use of a sink pump. The whole operation can be completed in one week only, at which time the tank is again ready for next group of fish. The tank is then ready for returning to the same site or to a new site. By shortening the "out of operation" time with several weeks, the utilisation of fixed assets improves significantly.

4.4 Detailed Description of the Invention Pertaining Specifically to Version 1

The buoyancy in version 1 consists of a collar integral and outside the tank located at the surface. The collar has multiple buoyancy segments built into the ring. If one segment is punctured, the remaining ones are able to retain sufficient buoyancy and the tank stable.

Apart from the buoyancy, the ring has the functionality of sludge storage (19), increased water ballast, mooring for boats and entering area, as well as fixing for horizontal mooring (3).

4.5 Detailed Description of the Invention Pertaining Specifically to Version 2

The enclosed geometrical shape allows the tank to become semi-submerged (so that it barely breaks the surface) shown in FIG. 2, or submerged below the surface shown in FIG. 3, while still retaining its operating functions. The version 2 has its buoyancy (24) and ballast tank (25) located to the widest part of the tank.

Version 2 of the tank may therefore be operated in three main positions; above surface, semi-submerged, and submerged, or any other desired position in-between.

The central vertical line, mounted inside the central tube in a separate tube in centre, is connected to a water-driven hydraulic cylinder or winch (28) at the top of the pipe, remains tight at all times. Horizontally, the tank may be moored into an existing mooring system in a farm, but may also be anchored satisfactory with the central vertical line only, or by other means. When the tank is moored to the seabed, it will be regulated according to the tide. The hydraulic cylinder has an adjustable pressure release valve to secure stable tension of the central vertical line and thereby keeping the tank in the correct vertical position.

The anchoring system reduces the vertical movement when the tank is exposed to wave action. This is particularly important in heavy waves where a pronounced vertical movement puts extra strain on mooring lines.

The tank becomes submersible by filling of the water ballast tanks and by tightening the central vertical mooring line (26). I detail the functionality is as follows:

While in surface position, a remotely operated valve is located well above the water line (27). The part of the air cap at the top of the tank is evacuated by opening the valve while central vertical mooring line is tightened. At the point where only a slightly positive buoyancy is obtained, the top valve is closed. The remaining buoyancy is neutralised by tightening the vertical central mooring line. The force required is provided by a water-driven hydraulic cylinder (28) or winch at the top of the tube. The hydraulic cylinder is remotely controlled.

Once in the submerged position, the tank can be brought to the surface by reversing the order of action. When releasing the tension of the vertical central mooring line, and emptying the ballast tanks, the tank is forced to the surface by its increasing buoyancy.

In all the positions, be it partly or wholly submerged, the tank retains its full functionality and farming capabilities.

Some of the air cap inside the tank (4) is retained to allow air access for the fish. Salmonids, common to fish farming, for instance Atlantic salmon (*Salmo salar*), Rainbow trout (*Onchorhynchus mykiss*), and Coho salmon (*Oncorhynchus kisutch*) have all physiological need for swim bladder pressure regulation. Air access is therefore important in version 2. It is shown that Atlantic salmon may perform without air for a period of seven days while after this period it will gradually reduce feed uptake and thrive less [12].

The central vertical mooring line in combination with regulation of the buoyancy allow the tank to stay in surface position for service, to become semi-submerged, or submerged so that it can withstand heavy waves while retaining its operational functions. In semi-submerged and submerged position, the tank deflects the wave forces. This offers significant benefits to the industry, as follows:
  i. Possible to farm fish in semi-exposed sites
  ii. Possible to farm fish in exposed sites iii. Possible to farm fish in areas with ice during winter while having access to temperate water below. The discharge of temperate water will keep the tank from freezing in.
iv. Less lost feeding days due to poor weather in any site
v. In surface position a sheltered working position for the operator that supports health and safety The water discharge module (29) is still outside the tank in Version 2 well below water surface. The innovative possibility to concentrate and collect fish faeces and feed spill pertains also Version 2. However, the level-adjustable passage (30) for the drainage of concentrated fish faeces is mounted on a floating device (31) inside the tank since the water level may change. The sludge is drained (33) into the circular holding tank (32) which is located outside the fish tank, where surplus water is drained off. The sludge-draining boat cannot enter before the tank again is in surface position (FIG. 2).

Because of the higher water level in the tank while in submerged position, the feeding pipes (34) are extended well above the water line inside the tank.

5. PROPERTIES AND ADVANTAGES

5-I:
The invention provides the first seamless fully contained large-scale surface and submersible fish rearing and storage system with capacity to be fully operational in variable water depth position, wave—, temperature—, and climate conditions.

5-II:
The fish tank of the invention significantly reduces the cage to cage, and the site to site infection pressure by
a. Sheltering the farmed fish population from direct influence of surface water that may contain harmful microorganisms from neighbouring farms.
b. Eliminating the risk of negative influence of marine preying birds (ex. seagulls, terns, herons etc.) whom may carry harmful microorganisms, by providing a fully contained fish tank.
c. Avoiding the entry of Salmon lice larvae by having the water intake below 20 meters and providing a fully contained cap, avoiding any splashing of waves and surface water into the cage.
d. Avoiding occurrence of salmon lice in farmed fish reared in the tank, eliminate the shedding of salmon lice, and thereby eliminate infection pressure to wild salmonids caused by current farming practices.
e. Protecting the fish from harmful microorganisms that are known to be carried by Salmon lice as vector 5-III:
The fish tank of the invention provides a complete physical barrier against predators. Farmed fish is prey for many wild animals like birds, otters, mink, seals, sharks etc. Predators are attracted to the farm by the smell, the sight and turning shoal of fish. Predators often cause damage to the nets. Predators can be vectors for microorganisms that can cause disease in farmed fish as they migrate from cage to cage and site to site. While trying to break into the cages, predators may harm or kill fish and tear the nets in the cage systems. While observing the predator, the fish are severely stressed and loose feed apetite. Stress can also elicit disease due to the suppression of the immune system. Exposure to predators reduces fish welfare.

5-IV:
The fish tank of the invention improves the feeding efficiency significantly compared to current farming practices. Current Norwegian salmon farming practice has a feed spill (fed but non-eaten feed) averaging 7%. The conditions in which net pen farmed fish are fed, display a great variation due to current, waves, sight and time of the year. Even though various types of control mechanisms are in place, like for example cameras, sensors etc, large amount of feed are lost. Feeding in the fish tank takes place at two different depths, the pellets are disseminated by the circular and upwards movement of the water, and fish can be fed to satiation by meal feeding. Cameras in the top layer of the tank will disclose over-feeding securing that an accurate meal is delivered to the fish. The tank provides a fully contained and controllable unit which significantly reduces feed spill.

5-V:
The fish tank of the invention has a new water flow system. All current semi-contained systems are pumping water through riser pipes. Water enters at the surface of the prior art units and discharges at the bottom or in the walls near the bottom. Opposite to this, the flow in the tank of the present invention is creating an upward circular current and discharges through a unit near the top. This counter principle does not cost more energy since the head difference of the water inside the tank compared to the outside, is still similar to current semi-contained systems. In addition, the central tube provides a guiding wall that prevents a typical vortex and counter-spin in the centre of a tank without centre tube. Furthermore, the upwards water supply through the central tube secures sufficient water replacement and circulation in the centre of the tank. The mixing of the various water supplies enables the operator to adjust the flow optimal to the fish welfare. The system also provides the operator with an improved overview of the tank since everything (feed spill, faeces, dead fish etc) are brought upwards and end up concentrated at the surface.

5-VI:
The fish tank of the invention significantly reduces discharge of faeces particles compared to current open net pen farming. The water flow (property 5 above) and the beneficial shape of the tank causes the faeces to concentrate and to surface at the perimeter of the tank. From here, it is possible to decant it into the collection and storage facility (30, 31, 32, 33). The ring sludge storage can keep sludge for a certain number of days. At the end of the period, the sludge is collected by a boat, which carry a sludge tank and a sludge-vacuuming device. Fish faeces is a valuable resource and particularly rich in phosphorus. Phosphorus as a mineral, is in world demand. The sludge collection system of the invention is integral to the tank and it is operational for both version 1 and 2. The sludge collection system according to the invention significantly reduces organic discharge per kilo of fish produced and it enables the industry to retrieve a valuable resource.

5-VII:
The grading and collection grid of the fish tank of the invention is integral to the tank. Once elevated slowly through the fish population it can serve as
a) A grader for harvest size fish by leaving smaller fish to pass between the bars that are crossing the central frame. Typically, an opening between the bars of 15 cm will grade off all fish above 4 kg.
b) A grader for medium sized fish at large and medium size at around average weight of 1.5-2 kg. Typically, a opening of 8 cm will grade off fish that are above 1.5 kg.
c) A fish collecting system to empty the tank by turning the bars to a closed position.

d) A fish collection system to count the fish in the tank by turning the bars to closed position.

5-VIII:

The central vertical mooring line in combination with regulation of the buoyancy allow the tank to stay in surface position for service, to become semi-submerged, or submerged so that it can withstand heavy waves while retaining its operational functions. In semi-submerged and submerged position, the tank deflects the wave forces. This offers significant benefits to the industry, as follows:
i. Possible to farm fish in semi-exposed sites
ii. Possible to farm fish in exposed sites
iii. Possible to farm fish in areas with ice during winter while having access to temperate water below. The discharge of temperate water will keep the tank from freezing in.
iv. Less lost feeding days due to poor weather in any site
v. In surface position a sheltered working position for the operator that supports health and safety

5-X:

The tank of the invention offers a unique opportunity to control the daylight during the entire sea phase. Although photoperiod treatment is common in fish farming, none of the treatments can offer permanent control of daylight in sea over months. The tank provides permanent control over light conditions and thereby control over the physiological functions in fish. Lights are mounted both above and below water surface.

5-XI:

The tank of the invention offers improved productivity per production site since it can be cleaned and fallowed during one week only as opposed to traditional farming equipment.

5-XII:

With its solid and firm construction and innovative characteristic described in 5-I, 5-III, and 5-VIII, the tank of the invention provides a significantly reduced risk of fish escaping. While in net pen farming, only the net is keeping the fish from escaping, this tank is fully contained with a solid barrier throughout the sea phase of the production. The walls are robust and cannot be teared. The environmental forces are easier deflected since the well-balanced geometrical shape absorbs the impacts in a more optimal way.

For version 1 the segmented buoyancy belt is located in the surface and will enable the tank to take direct hit from the sea, boats and debris.

5-XIII:

The double-curved surface provides a wave attenuation effect both at front—, and rear end and reduce the risk of wave resonance in the tank.

6. REFERENCES

1. Fish to 2030. World Bank report. 2013.
2. Kent M L and Poppe T T, Editors of text book. 1998. *Diseases of Seawater Net pen-reared Salmonid Fishes*. Fisheries and Oceans Canada. Nanaimo, BC.
3. Norwegian Veterinary Institute. Annual Fish Health Report. http://www.vetinst.no/eng/Publications/Fish-Health-Report/Fish-Health-Report-2014
4. Jones S R M, Bruno D W, Madsen L, and Peeler E J. 2015. Disease management mitigates risk of pathogen transmission from maricultured salmonids. Aquaculture Environment Interactions. Vol. 6: 119-134.
5. Hoech P A, and Mo T A. 2001. A model of salmon louse production in Norway: Effects of increasing salmon production and public management measures. Diseases of Aquatic Organisms, 45: 145-152.
6. Raynard R, Wahli T, Vatsos I, and Mortensen S. 2007. Review of diseases interaction and pathogen exchange between farmed and wild finfish and shellfish in Europe. The DIPNET project under the 6$^{th}$ EU Framework Programme Priority 8, Scientific Support Policy (SSP). Published by Veso, Norway on behalf of the Consortium.
7. Heuch P A, Nordhagen, J R, and Schram T A. 2000. Egg production in the salmon louse [*Lepeohtheirus salmonis* (Krøyer)] in relation to origin and water temperature. Aquaculture Research, 31: 805-814.
8. Jansen P A, Kristoffersen A B, Viljugrein H, Jimenez D, Aldrin M, Stien A. Sea lice as a density-dependent constraint to salmonid farming. Proceedings of the Royal Society of London. Series B: Biological Sciences. 2012; 279:2314-2322.
9. Hoech P A, Parsons A, Boxaspen K. 1995. Diel vertical migration: a possible host-finding mechanism in salmon louse (*Lepeophtheirus salmonis*) copepodids? Can. J. Fish. Aquat. Sci. 52,681-689.
10. Hevrøy E M, Boxaspen K, Oppedal F, Taranger G L, and Holm J C. 2003. The effect of artificial light treatment and depth on the infestation of the sea louse *Lepeophtheirus salmonis* on Atlantic salmon (*Salmo salar* L.) culture. Aquaculture 220, 1-14.
11. Frenzl B, Stien L H, Cockerill D, Oppedal F, Richards R H, Shinn A P, Bron J E, Migaud H. 2014. Manipulation of farmed Atlantic salmon swimming behaviour through the adjustment of lighting and feeding regimes as a tool for salmon lice control. Aquaculture 424-425, 183-188.
12. Nilsen A et. al. Pilot Aqua Future. 2012. Sluttrapport 2013 May 28 ANI (in Norwegian)
13. Lien A M, Høy E. 2011. Report: Skjørt for skjerming mot lus i laksemerd. SINTEF Fisheri og Havbruk A S. ISBN 978-82-14-05120-9 (in Norwegian)
14. Tveit K J. 2012. Nytt "luseskjørt" stoppar lusa. (New "sealice skirt" stops the sealice). Kyst. no 30.04.2102 (in Norwegian).
15. Stien L H, Nilsson J, Hevrøy E M, Oppedal F, Kristiansen T S, Lien A M, and Folkedal O. 2012. Skirt around salmon sea cage to reduce infestation of salmon lice resulted in low oxygen levels. Aquaculture Engineering 51 (2012), 21-25.
16. Nylund A, Hovland T, Hodneland K., Nilsen F, and Løvik P. 1994. Mechanisms for transmission of infectious *salmon anaemia* (ISA). Diseases of Aquatic Organisms. Vol. 19:95-100.
17. Nylund S, Nylund A, Watanabe K, Arnesen C E, Karlsbakk E. 2010. Paranucleospora theridion n. gen., n. sp. (Microsporidia, Enterocytozoonidae) with a life cycle in the Salmon louse (*Lepeophtheirus salmonicidae*) and Atlantic salmon (*Salmo salar*). The Journal of Eukariotic Microbiology. March-April 57(2): 95-114.
18. Jakob E, Barker D E, and Garver K A. 2011. Vector potential of the salmon louse *Lepeophtheirus salmonicidae* in the transmission of infectious *hematopoietic necrosis virus* (IHNV). Disease of Aquatic Organisms (2011) 97(2), 155-65.
19. Torrisen O, Jones S, Asche F, Guttormsen A, Skilbreid O T, Nilsen F, Horsberg T E and Jackson D. 2013. Salmon lice—impact on wild salmonids and salmon aquaculture. Journal of Fish Diseases 36(3), 171-94.
20. Krkosek M, Revie C W, Gargan P G, Skilbreid O T, Finstad B, and Todd C D. 2013. Impact of parasites on salmon recruitment in the Northeast Atlantic Ocean. Proc R Soc B. 280: 20122359.
21. Costello, M. J. 2009b. How sealice from salmon farms may cause wild salmonids declines in Europe and North- America and be threat to fishes elsewhere. Proceedings of the Royal Society 276, 3385-3394.
22. Aldrin, M., Storvik, B., Kristoffersen, A. B., Jansen, P. A. (2013). Space-time modelling of the spread of salmon lice between and within Norwegian Salmon Farms. www.plosone.org.
23. Skiftesvik A B, Bjelland R M, Durif C M F, Johansen I S, and Brownman H I. 2013. Delousing of Atlantic salmon (*Salmo salar*) by cultured vs. wild ballan wrasse (*Labrus bergylta*). Aquaculture 402-403 (2013) 113-118.
24. Costello, M. J. 2009a. The global economic cost of sealice to the salmonide farming industry. Journal of Fish Diseases 32, 115-118.
25. Asche F, Bjørndal T. The economics of Salmon Aquaculture. Chichester: Wiley-Blackwell; 2011.
26. Ministry of Trade, Industry and Fisheries. Predictable and environmentally sustainable growth in Norwegian salmon and trout farming industry. White Paper to The Parliament 2015. https://www.regjeringen.no/no/aktuelt/barekraftig-og-forutsigbar-vekst-for-laks/id2401801/ (Norwegian)
27. Norwegian Regulation regarding mandatory fallowing periods per site. Chapter 4 § 40. https://lovdata.no/dokument/SF/forskrift/2008-06-17-822#KAPITTEL_4
28. Norwegian Regulation regarding zone fallowing for the prevention and combating of Salmon lice in Hardanger and Sunnhordland. § 11.
29. Overview over sites in which Norwegian Food Safety Authority has enacted reduction of production capacity due to unsatisfactory levels of Salmon lice. http://www.mattilsynet.no/fisk_og_akvakultur/fiskehelse/30.
30. Bleie H, Skrudland A. 2014. Tap av laksefisk i sjø. Food Safety Authority, Norway. (Norwegian, English summary)
31. Nofima data—to come
32. Ytrestøyl T, Aas T S, Åsgård T. 2014. Resource utilisation of Norwegian salmon farming in 2012 and 2013. Nofima report 36/2014. www.nofima.no.
33. Ytrestøyl T, Løes A K, Kvande I, Martinsen S, and Berge G M. 2013. Utilisation of fish faeces in biogas production: Technology and possibilities. ISBN: 987-82-8296-067-0. www.nofima.no
34. Norwegian Directorate of Fisheries statistics of escapees. (Norwegian) http://www.fiskeridir.no/Akvakultur/Statistikk-akvakultur/Roemmingsstatistikk
35. Thorstad E B, Flemming I A, McGinnity P, Soto D, Wennevik V, and Whoriskey F. 2008. Incidence and impacts of escaped farmed atlantic salmon *Salmo salar* in nature. Norwegian Institute for Nature Research. Special report 36, 110 pp.
36. Dempster T, Jensen O, Fredheim A, Uglem I, Thorstad E, Somarakis S, and Sanchez-Jerez P. 2013. Escapes of fishes from European sea-cage aquaculture: environmental consequences and the need to better prevent escapes. PREVENT ESCAPE Project compendium. ISBN 978-82-14-05565-8. www.preventescape.eu

What is claimed is:

1. A fish rearing tank comprising:
an egg-shaped shell having a generally vertical long axis and gradually narrowing shape towards a minor, upper, tip portion, said egg-shaped shell for holding a water volume in a major, wider, lower portion and enclosing air in said minor, upper, tip portion, said egg-shaped shell forming a closed, generally rigid tank and having one or more water inlets, and one or more water outlets; and
a ring-shaped buoyancy collar mounted on said egg-shaped shell,
wherein said egg-shaped shell has a fixed ballast in a lower end of said wider, lower portion of said egg-shaped shell.

2. The fish rearing tank of claim 1, wherein said ring-shaped buoyancy collar is arranged near said minor, upper, tip portion, for holding said egg-shaped shell in a semi-submerged position with said minor, upper, tip portion extending above a sea surface.

3. The fish rearing tank of claim 2, said ring-shaped buoyancy collar (24) further having a ring-shaped water ballast tank for submerging said egg-shaped shell with said minor, upper, tip portion below a sea surface.

4. The fish rearing tank of claim 2, further comprising a passage near a perimeter of an internal water surface, to a circular holding tank in said ring-shaped buoyancy collar, said circular holding tank being for sludge, non-eaten fodder, fish excrements, and being provided with a drain for excess water.

5. The fish rearing tank of claim 1, further comprising an axially oriented central tube extending axially from the minor, upper, tip portion of the egg-shaped shell to said major, wider, lower portion of said egg-shaped shell.

6. The fish rearing tank of claim 5, wherein said one or more water inlets are arranged in said major, wider, lower portion of said egg-shaped shell, and
wherein said one or more water outlets are near below an internal water surface level of said egg-shaped shell, to allow bottom to top or reverse-circulation of water through said egg-shaped shell, while maintaining a volume of the air in said minor, upper, tip portion.

7. The fish rearing tank of claim 5, further comprising one or more water inlets arranged through a side wall of said central tube to within the water volume of said egg-shaped shell.

8. The fish rearing tank of claim 7, wherein said one or more water inlets though a side wall of said central tube are arranged just above said fixed ballast.

9. The fish rearing tank of claim 5, further comprising a lower inlet pump arranged at a lower end of said central tube.

10. The fish rearing tank of claim 5, further comprising:
a hydraulic cylinder or winch arranged within said axial oriented central tube and in said minor, upper, tip portion; and
a vertical mooring line extending from said hydraulic cylinder or winch and downwardly through a lower end of said central tube (2) and to an anchor at the seabed.

11. The fish rearing tank of claim 5, wherein feeding pipes are arranged from above an internal water surface, within said central tube and have a lower opening below water from said central tube, and
wherein an air driven piston at a top of the feeding pipes is arranged for moving downwardly after a batch of pellet fodder has been fed into said feeding pipes, to push fodder out of said lower opening to provide fish with said batch of fodder.

12. The fish rearing tank of claim 1, wherein said one or more water inlets is horizontal and tangentially directed into the water within said egg-shaped shell, said one or more water inlets being provided by water from main pumps.

13. The fish rearing tank of claim 1, further comprising a vertical axially running folding fish grid, comprising a water-permeable central frame for running on said central tube, wherein said fish grid has folding wings, and is arranged for folding in towards said central tube and is arranged for folding out with outer ends of said wings for following an inner surface of said egg-shaped shell, wherein said folding fish grid is arranged for being stored in a folded-in position within air above an internal water surface level and within said minor, upper, tip portion, wherein said folded fish grid is arranged for being lowered to a position below said internal water surface in said egg-shaped shell, wherein said fish grid is arranged for being unfolded for the folding wings to engage with said inner surface of the egg-shaped shell, and wherein said unfolded fish grid is arranged for being elevated to force part of all of the fish above said fish grid to move upwardly toward said minor, upper, tip portion.

14. The fish rearing tank of claim 13, further comprising ellipsoid grid bars in said fish grid arranged for being rotated between a closed position impenetrable for fish, to a partly or fully open position wherein fish below a given grating size may pass said fish grid.

15. The fish rearing tank of claim 1, further comprising:
an air valve arranged above an internal water level and in a volume of the air within said minor, upper, tip portion, so as for letting out air in order to reduce the floatability of said egg-shaped shell, wherein said air valve is arranged at the upper allowable internal water level within said otherwise air-filled minor, upper, tip portion; and a ventilation fan in said air-filled minor, upper, tip portion that also regulates adequate air intake.

16. The fish rearing tank of claim 1, said egg-shaped shell being seamless.

17. The fish rearing tank of claim 1, wherein said egg-shaped shell generally has a double wall.

18. The fish rearing tank of claim 1, wherein the volume of said egg-shaped shell is between 4500 m$^3$ and 22000 m$^3$ or more.

19. A method of rearing fish, comprising the steps of:
providing a fish rearing tank comprising:
an egg-shaped shell having a generally vertical long axis and gradually narrowing shape towards a minor, upper, tip portion, said egg-shaped shell for holding a water volume in a major, wider, lower portion and enclosing air in said minor, upper, tip portion, said egg-shaped shell forming a closed, generally rigid tank and having one or more water inlets, and one or more water outlets; and
a ring-shaped buoyancy collar mounted on said egg-shaped shell,
wherein said egg-shaped shell has a fixed ballast in a lower end of said wider, lower portion of said egg-shaped shell;
placing a number of fish in said egg-shaped shell;
circulating in fresh seawater through said one or more water inlets arranged in said major, wider, lower portion of said egg-shaped shell; and
circulating out used water through said one or more water outlets near an internal water surface level of said egg-shaped shell, so as for conducting bottom to top circulation of water through the egg-shaped shell, while maintaining a volume of the air in said minor, upper, tip portion.

20. The method of claim 19, further comprising the steps of:
arranging a hydraulic cylinder or winch within a vertical, axially oriented central tube, said hydraulic cylinder or winch being arranged in said minor, upper, tip portion;
extending a vertical mooring line from said hydraulic cylinder or winch downwardly through a lower end of said central tube and to an anchor at the seabed;
tightening said mooring line; and
adjusting the mooring line tension to the tide.

21. The method of claim 20, for moving all or part of the fish within said shell, further comprising the steps of:
providing a vertical axially running, folding fish grid comprising a water-permeable central grating frame for running on said central tube, said fish grid having folding wings arranged for folding in towards said central tube and further arranged for folding out with their outer ends for following the inner surface of said egg-shaped shell;
initially storing said folded grating frame within air in said minor, upper, tip portion of said egg-shaped shell;
running said folded grating frame to the lower end of said egg-shaped shell;
unfolding said grating frame for said folding wings to reside with their outer ends near or at said inner surface of said egg-shaped shell;
adjusting a grating so as for enabling sorting or moving a part or all of the contained fish population;
running said grating frame upwardly while said folding wings follow said inner surface of said egg-shaped shell, thereby sorting or moving said part of the contained fish; and
folding in said folding wings and running said central grating frame to above said internal water surface, for internal storage while not in use for grating.

22. The method of claim 20, further comprising the steps of:
pumping in water tangentially through said water inlets near said major, wider, lower portion of said egg-shaped shell, so as for generating a rotational and upward water movement about said central axial tube, to said one or more water outlets near said internal water surface' and
due to said rotational and rising water movement, allowing particles to concentrate at said internal water surface towards a perimeter of said fish rearing tank, and letting out said surface particles to move out over a passage to a surrounding circular sludge holding tank.

23. The method of claim 20, further comprising the steps of:
loading feed into one or more feeding pipes mounted inside the central tube and extending between 3 meters above water level and ending approximately 5 and 10 meters above the bottom of the tank at which point they exit the tube into the tank through an opening;
driving an air driven piston downwardly after the filling with a batch of desired volume of feed into the pipe; and
pushing the feed downwards and out of the lower opening of the pipe providing fish with batches of fodder.

24. The method of claim 19, further comprising the steps of:
opening an air valve to let out part of the air contained in said tip portion;
allowing the minor, upper, tip portion to submerge to a desired depth below the sea surface, while conducting the circulation of water through said egg-shaped shell;
controlling a water content in a ballast tank about said egg-shaped shell; and allowing said minor, upper, tip portion to submerge to a desired depth below a sea surface, while conducting said circulation of water through said egg-shaped shell.

* * * * *